United States Patent
Matsumoto

[11] Patent Number: 6,078,578
[45] Date of Patent: Jun. 20, 2000

[54] COMMUNICATION APPARATUS

[75] Inventor: Mariko Matsumoto, Tokyo, Japan

[73] Assignee: NEC Corporation, Tokyo, Japan

[21] Appl. No.: 08/763,731

[22] Filed: Dec. 11, 1996

[30] Foreign Application Priority Data

Dec. 11, 1995 [JP] Japan .................................. 7-321417

[51] Int. Cl.[7] .............................. H04J 3/06; H04B 1/18; H04B 1/06; H04B 7/00
[52] U.S. Cl. .................... 370/350; 370/503; 375/344; 375/362; 455/192.2; 455/231; 331/34; 329/318
[58] Field of Search .................... 370/350, 345, 370/347, 522, 498, 503; 375/344, 354, 362, 319; 455/192.2, 231; 331/34, 12, 1 B, 36 C; 329/318, 315, 323

[56] References Cited

U.S. PATENT DOCUMENTS

| | | | |
|---|---|---|---|
| 4,466,108 | 8/1984 | Rhodes | 375/344 X |
| 4,856,027 | 8/1989 | Nakamura et al. | 375/344 X |
| 4,887,050 | 12/1989 | Borth et al. | 331/34 |
| 5,027,352 | 6/1991 | Goode | 370/345 |
| 5,287,388 | 2/1994 | Ogura et al. | 375/344 |
| 5,450,442 | 9/1995 | Umemoto et al. | 375/354 X |
| 5,724,653 | 3/1998 | Baker et al. | 375/319 X |

FOREIGN PATENT DOCUMENTS

| | | |
|---|---|---|
| 0441593 | 8/1991 | European Pat. Off. . |
| 61-136349 | 6/1986 | Japan . |
| 1-191548 | 8/1989 | Japan . |
| 3-3454 | 1/1991 | Japan . |
| 3-209948 | 9/1991 | Japan . |
| 4-207548 | 7/1992 | Japan . |
| 4207548 | 7/1992 | Japan . |
| 6-37821 | 2/1994 | Japan . |
| 6-46051 | 2/1994 | Japan . |
| 6-252966 | 9/1994 | Japan . |
| 7-183927 | 7/1995 | Japan . |
| 8-237317 | 9/1996 | Japan . |
| 158485 | 10/1998 | Japan . |
| 2271230 | 6/1994 | United Kingdom . |

*Primary Examiner*—Huy D. Vu
*Assistant Examiner*—Kevin C. Harper
*Attorney, Agent, or Firm*—Sughrue, Mion, Zinn, Macpeak & Seas, PLLC

[57] ABSTRACT

There are a receiving unit for receiving a TDMA signal which is FSK (FM) modulated by a signal containing known information, and a demodulating unit 103 for demodulating received data. The demodulating unit 103 outputs a demodulated signal in a direct connection to a C-coupling. A C-coupling demodulation signal is inputted to a synchronization detecting unit 105, and a directly connected demodulation signal is inputted to an AFCBU 106. After a power supply is turned on, the C-coupling demodulation signal is inputted to the synchronization detecting unit 105. The demodulation signal whose synchronization state is being detected is inputted to the AFC unit 106 in a parallel condition and in a direct connection condition. After the synchronization signal is detected, a frequency offset correction is applied to thereby change a frequency offset of the frequency-converted signal by a carrier wave frequency converting section 10. After that, the demodulation signal is inputted to a data processing unit in a direct connection condition.

10 Claims, 6 Drawing Sheets

COMMUNICATION APPARATUS

BACKGROUND OF THE INVENTION

1. Field of the Invention

The present invention relates to a communication apparatus having a frequency offset correcting function, and more particularly to a communication apparatus having a frequency offset correcting function used at a time of receiving a frequency modulation type of a TDMA signal.

2. Description of the Related Art

Recently, a digital mobile communication has been popular. A time division multiple access (TDMA) type is commonly employed in the digital mobile communication. In many cases, a high frequency is used in the mobile communication. In such a high carrier wave frequency, it is difficult to obtain a local oscillation signal having a high stable oscillation frequency from a crystal oscillator (XTAL). For this reason, a frequency offset is brought about because of effects of a deviation of the XTAL oscillation frequency, a performance of a demodulation IC (IFIC) and the like. Thus, the communication apparatus requires a frequency offset correcting function.

For example, a conventional communication apparatus having the frequency offset correcting function is disclosed in Japanese Patent Application Laid Open (KOKAI) No. 4-207548 (hereafter, referred to as a prior art) Title of the invention is "Synchronizing Apparatus". The synchronizing apparatus disclosed in this official gazette comprises an input circuit, a local oscillator, a carrier wave frequency converter, a frequency offset corrector, an equalizer and a synchronization detector to thereby carry out a synchronization detection accurately. In this prior art, the equalizer (demodulating unit) and the synchronization detector are directly connected to each other. In a case that a frequency offset exceeds an operation range of the equalizer, the equalizer is not driven. In other words, the equalizer has an equalizing and demodulating capability when the frequency offset is equal to or less than a constant value. For this reason, when a signal having the frequency offset exceeding the operation range is inputted to the equalizer, a corresponding action is carried out by changing a parameter of the equalizer.

For this reason, the prior art has defects described below. Normally, a frequency offset range of a frequency modulation wave is equal to a maximum frequency deviation at a two-value FSK, and equal to ⅓ times the maximum frequency deviation at a four-value FSK. If a signal having the frequency offset exceeding the operation range is inputted to the equalizer, the parameter of the equalizer must be changed. The working is complex, and it takes a long time.

SUMMARY OF THE INVENTION

It is therefore an object of the present invention to provide a communication apparatus having a frequency offset correcting function, which can carry out a frequency offset correction without changing a parameter of an equalizer (demodulating unit).

A communication apparatus having a frequency offset correcting function in accordance with a preferred first embodiment of the present invention includes: an input portion for inputting as a received signal a TDMA signal which is angle-modulated by a signal containing known information in which a level is not deviated; a carrier wave frequency converter for including a local oscillator of oscillating a local oscillation signal having a changeable oscillation frequency, converting a carrier wave frequency of the received signal on the basis of the local oscillation signal and outputting a frequency-converted signal; a demodulating unit for demodulating the frequency-converted signal and outputting a demodulation signal; a synchronization detecting unit for comparing the demodulation signal with a known signal pattern to thereby carry out a synchronization detection and for outputting a synchronization detection signal when detecting a synchronization state; a condenser coupling unit for direct-current-cutting the demodulation signal through a condenser coupling and for sending to the synchronization detecting unit; and an automatic frequency control unit for corresponding to the synchronization detection signal, calculating a frequency offset of the frequency-converted signal from a level of the demodulation signal, inputting this calculated result as an AFC signal to the local oscillator and changing an input carrier wave frequency.

A communication apparatus having a frequency offset correcting function in accordance with a second embodiment of the present invention includes: an input portion for inputting as a received signal a TDMA signal which is angle-modulated by a signal containing known information in which a level is not deviated; a demodulating unit for demodulating the received signal and outputting a demodulation signal; an offset feedback unit for feeding back an AFC signal indicating a frequency offset to the demodulation signal to thereby changing an output signal; a synchronization detecting unit for comparing the demodulation signal with a known signal pattern to thereby carry out a synchronization detection and for outputting a synchronization detection signal when detecting a synchronization state; a condenser coupling unit for direct-current-cutting the demodulation signal through a condenser coupling and for sending to the synchronization detecting unit; and an automatic frequency control unit for corresponding to the synchronization detection signal, calculating the frequency offset of the demodulation signal from a level of the demodulation signal, inputting this calculated result as the AFC signal to the offset feedback unit and changing the output signal.

In the present invention, the demodulating unit and the synchronization detecting unit are coupled to each other through a condenser coupling unit. When the synchronization detecting unit carries out the synchronization detection from the demodulation signal of the demodulating unit, the condenser coupling unit removes the direct current-component from the demodulation signal and sends the modified signal to the synchronization detecting unit. This allows synchronization detection that could not be previously carried out because of an extremely large deviation of the frequency offset, as the frequency offset is not corrected.

BRIEF DESCRIPTION OF THE DRAWINGS

These and other objects, features and advantages of this invention will become more fully apparent from the following detailed description taken with the accompanying drawings in which.

In the drawings, the same reference numerals denote the same structural components.

DESCRIPTION OF THE PREFERRED EMBODIMENTS

Figure 1:
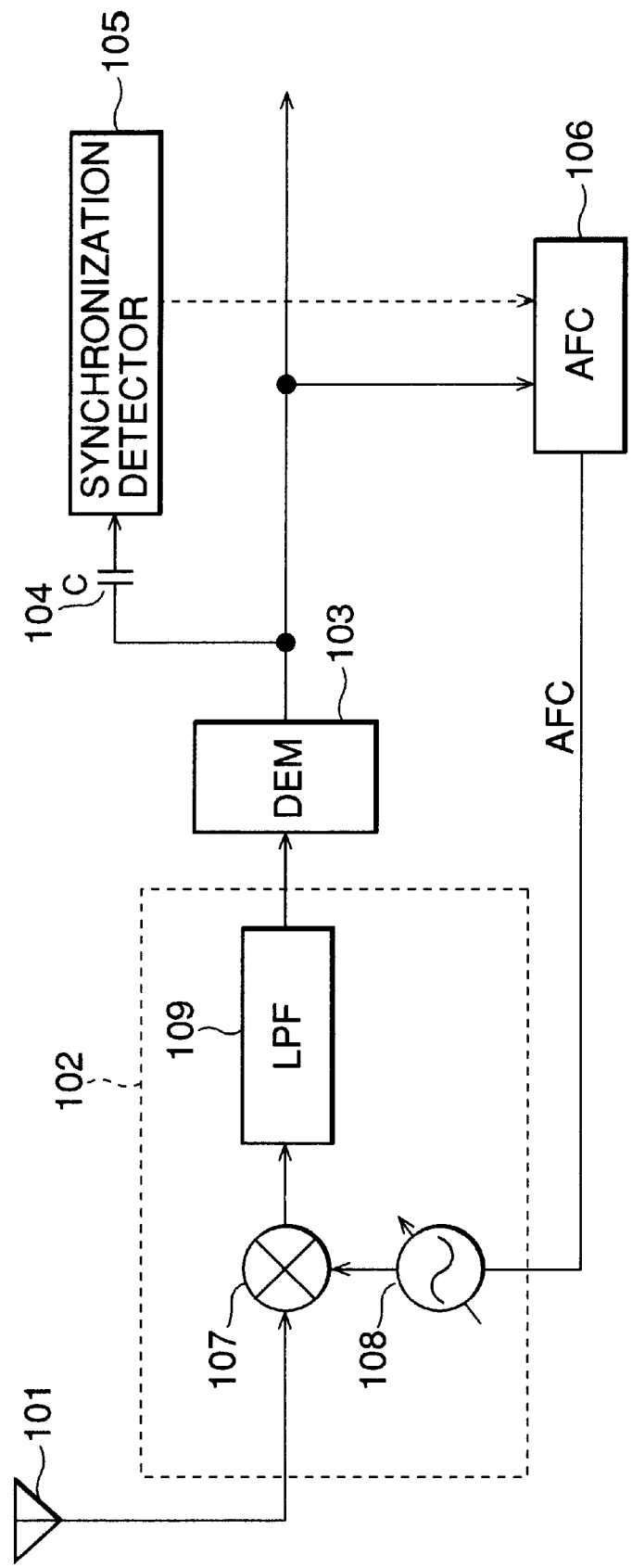
FIG. 1 is a function block diagram of showing a communication apparatus having a frequency offset correcting function in accordance with a preferred embodiment of the present invention.

Embodiments of the present invention are explained hereafter in detail with reference to the drawings. A communication apparatus having a frequency offset correcting function in accordance with a preferred first embodiment of the present invention is explained with reference to FIG. 1. In FIG. 1, a solid line represents a signal line, and a dashed line represents a control line. The communication apparatus having the frequency offset correcting function shown in FIG. 1 is provided with an antenna 101, a carrier wave frequency converting unit 102, a demodulating unit 103, a condenser coupling unit 104, a synchronization detecting unit 105 and an automatic frequency controlling (AFC) unit 106.

The antenna 101 receives an FSK (FM) modulation signal and outputs the received signal. The carrier wave frequency converting unit 102 is provided with a mixer unit 107, a local oscillator 108 and a low pass filter (LPF) unit 109. The local oscillator 108 oscillates a local oscillation signal having a changeable oscillation frequency. The mixer unit 107 mixes the local oscillation signal outputted by the local oscillator 108 and the received signal to thereby mix down the carrier wave frequency of the received signal. The LPF unit 109 removes an unnecessary element from the output signal from the mixer unit 107 and outputs a frequency-converted signal.

The demodulating unit 103 FM-demodulates the frequency-converted signal and outputs the demodulation signal. The condenser coupling unit 104 cuts a direct current element of the demodulation signal and sends to the synchronization detecting unit 105. This is carried out in order to ensure a synchronization detection even if there is an extremely large deviation of a frequency offset.

The synchronization detecting unit 105 compares the demodulation signal sent through the condenser coupling unit 104 from the demodulating unit 103 with a known pattern (pattern matching) to thereby carry out the synchronization detection. At a time of detecting a synchronization state, the synchronization detecting unit 105 outputs a synchronization detection signal. The AFC unit 106 corresponds to the synchronization detection signal, calculates the frequency offset of the frequency-converted signal from a level of the demodulation signal from the demodulating unit 103, and sends an AFC signal to the local oscillator 108 of the carrier wave frequency converting unit 102.

Next, an operation of the communication apparatus having the frequency offset correcting function shown in FIG. 1 is explained.

The FSK (FM) modulation signal received by the antenna 101 is FM-demodulated by the demodulating unit 103, after the carrier wave frequency thereof is changed by the carrier wave frequency converting unit 102. Next, the synchronization detection is carried out from the demodulation signal outputted by the demodulating unit 103. However, this apparatus is driven in such a way that it outputs a signal to which the frequency offset correction is not applied before the synchronization state is detected, and that it outputs the signal to which the frequency offset correction is applied after the synchronization is detected.

For this reason, there may be a possibility that the synchronization detecting action can not be carried out because of the extremely large deviation of the frequency offset, at a time of detecting the synchronization. In order to protect against this possibility, the demodulation signal, whose direct current element is cut by the condenser coupling unit 104, is sent to the synchronization detecting unit 105.

The AFC unit 106 inputs, in a direct connection, the level of the demodulation signal outputted by the demodulating unit 103, calculates the frequency offset of the frequency-converted signal from the level of the inputted demodulation signal, and outputs as the AFC signal a signal indicating a calculated result. Generally, in a case of the FM demodulation, the deviation of the carrier wave frequency of the FSK (FM) modulation wave can be easily calculated since it is proportional to the deviation of a direct current level of the demodulation signal. This AFC signal is inputted to the local oscillator 108 to thereby change the input carrier wave frequency. At this time, the AFC unit 106 carries out the frequency offset correcting operation, with the synchronization detection signal from the synchronization detecting unit 105 as a trigger.

Figure 2:
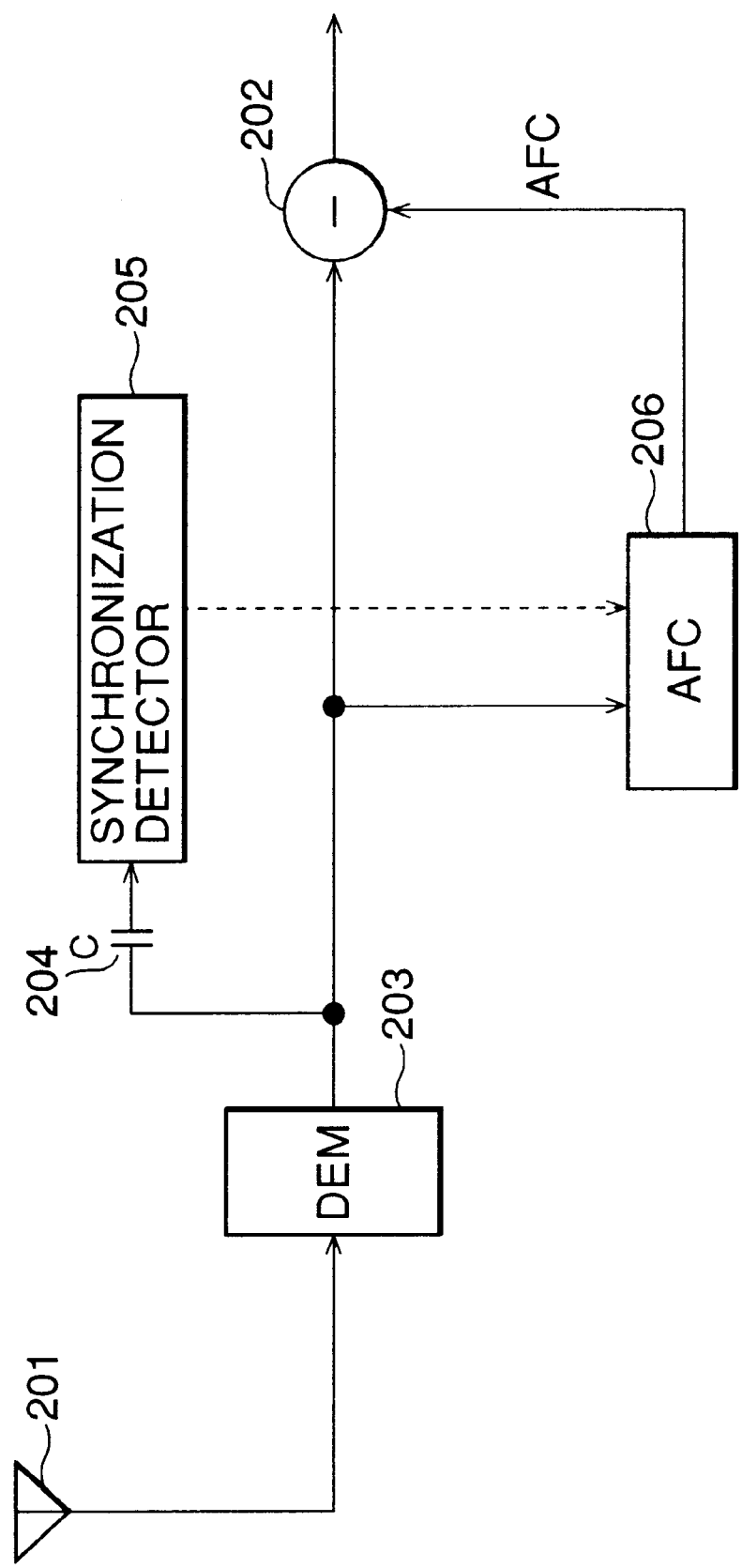
FIG. 2 is a function block diagram of showing a communication apparatus having a frequency offset correcting function in accordance with another embodiment of the present invention.

A communication apparatus having a frequency offset correcting function in accordance with a preferred second embodiment of the present invention is explained with reference to FIG. 2. In FIG. 2, a solid line represents a signal line, and a dashed line represents a control line. The communication apparatus having the frequency offset correcting function shown in FIG. 2 is provided with an antenna 201, an offset feedback unit 202, a demodulating unit 203, a condenser coupling unit 204, a synchronization detecting unit 205 and an AFC unit 206.

The antenna 201 receives the FSK (FM) modulation signal and output the received signal. The demodulating unit 203 FM-demodulates the received signal to thereby output the demodulation signal. The offset feedback unit 202 feeds back an AFC signal (described later) indicating the frequency offset to the demodulation signal to thereby change a level of an output signal. The condenser coupling unit 204 cuts a direct current element of the demodulation signal and sends to the synchronization detecting unit 205. The synchronization detecting unit 205 compares the demodulation signal with a known pattern to thereby carry out the synchronization detection, and outputs the synchronization detection signal at a time of detecting a synchronization state. The AFC unit 206 corresponds to the synchronization detection signal, calculates the frequency offset from the demodulation signal, and sends a signal indicating the frequency offset obtained by the calculation, as the AFC signal, to the offset feedback unit 202.

Next, an operation of the communication apparatus having the frequency offset correcting function shown in FIG. 2 is explained.

The FSK (FM) modulation signal received by the antenna 201 is FM-demodulated by the demodulating unit 203. Next, the demodulation signal outputted by the demodulating unit 203 is level-changed and outputted by the offset feedback unit 202.

The synchronization detecting unit 205 carries out the synchronization detection from the demodulation signal outputted by the demodulating unit 103. However, this apparatus is driven in such a way that it outputs the signal to which the frequency offset is not applied before the synchronization state is detected, and that it outputs the signal to which the frequency offset correction is applied after the synchronization state is detected. For this reason, there may be the possibility that the synchronization detection can not be carried out because of the extremely large deviation of the frequency offset when the synchronization detecting unit 205 detects the synchronization state. In order to protect against this possibility, the direct current element is removed by the condenser coupling unit 204, and then the demodulation signal is sent to the synchronization detecting unit 105.

The AFC unit 206 directly receives the level of the demodulation signal outputted by the demodulating unit 203, calculates the frequency offset of the demodulation signal from the level of the inputted demodulation signal, and inputs a signal indicating a calculated result, as the AFC signal, to the offset feedback unit 202 to thereby change the level of the output signal. Generally, in a case of the FM demodulation, the deviation of the carrier wave frequency of the FSK (FM) modulation wave can be easily corrected since it appears as the deviation of the direct current level in the demodulation signal. At this time, the AFC unit 206 carries out the frequency offset correcting operation, with the synchronization detection signal from the synchronization detecting unit 205 as the trigger.

Figure 3:
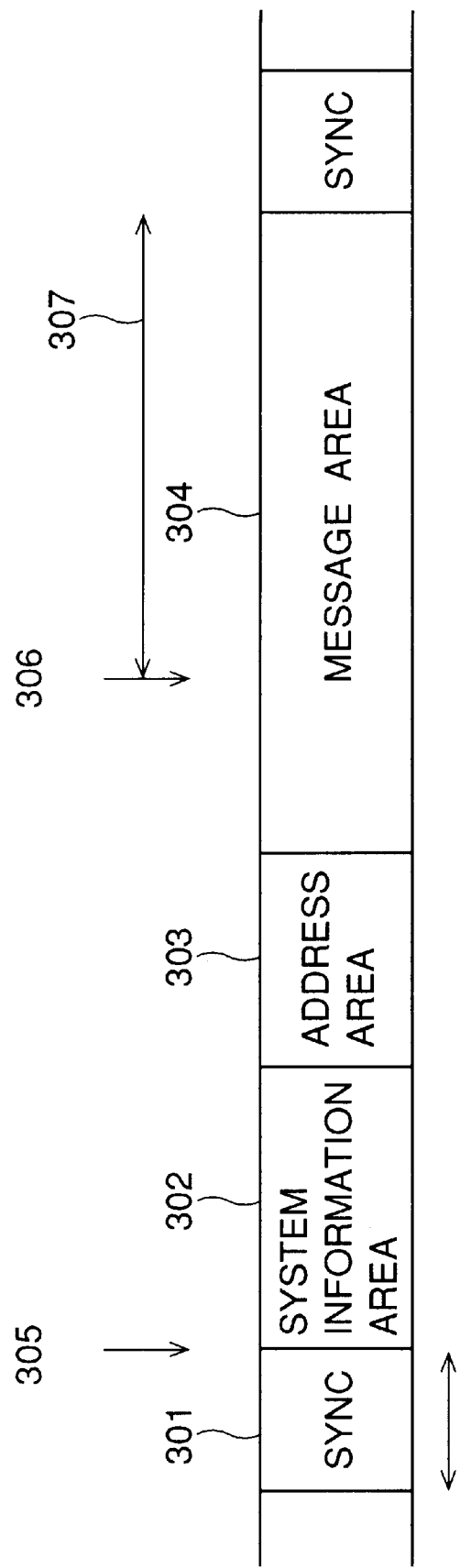
FIG. 3 is a diagrammatic view of a TDMA signal format containing a known signal received by the communication apparatus in accordance with the present invention.

FIG. 3 is a diagrammatic view of a TDMA signal format including a known signal. The TDMA signal format shown in FIG. 3 is composed of a synchronization area 301 constituted by a synchronization signal (SYNC) that is a known pattern in which a level is not deviated, a system information area 302 including position information and control information of a system, an address area 303 indicating a destination of data and a message area 304 including transmission data.

Next, operations of the communication apparatuses (FIGS. 1 and 2) for receiving a signal format shown in FIG. 3 are explained.

The synchronization detecting units 105, 205 of the communication apparatuses compares the demodulation signal with a known synchronization pattern to thereby carry out the synchronization detection 305. In this invention, at this time, the demodulation signal is inputted to the synchronization detecting units 105, 205 through condenser coupling (hereafter, referred to as a C coupling). In a case of C-coupling digital signals, a normal digital signal contains the direct current element. Thus, because of the removal of the direct current element by the C-coupling, an error is brought about in the data. However, this synchronization signal has the known pattern in which the level does not deviate. Therefore, even if the direct current element is cut by the C-coupling, this process does not result in the data error.

Here, the data in which the level does not deviate means the data described below. For example, when saying two values, it is a pattern including substantially same numbers for "0" and "1". Or, for example, when saying four values, it is a pattern in which a total of respective levels "+3", "+1", "−1" and "−3" of the demodulation signal included in this pattern is substantially zero.

The AFC units 106, 206 carry out the frequency offset correction, with this synchronization detection signal as a trigger. The frequency offset in the AFC units 106, 206 can be carried out by utilizing the data in which the synchronization pattern is not deviated. That is, since the synchronization pattern is the data in which the level does not deviate, the total of the levels of the demodulation signal in the synchronization pattern is zero. By utilizing this fact, the total of the levels of the demodulation signal is calculated for a period of the synchronization pattern. It is considered that if a calculated total result is not zero, an error thereof is proportional to the frequency offset of the modulation wave.

After that, the communication apparatus receives the control signal of the system information area 302 and the like, and further compares an input signal with an address of its own communication apparatus during a receiving process at the address area 303 to thereby carry out a self-address detection. In a case of detecting that a message to its own communication apparatus is included by the self-address detection, the communication apparatus further receives the message to its own communication apparatus (hereafter, referred to as a self-message). After a self-message reception finish 306, the communication apparatus normally stops most of a power supply and a clock in order to make an electric power small, becomes in a battery saving state 307, and continues to keep the battery saving state until a next reception timing (a next synchronization unit reception and the like).

Figure 4:
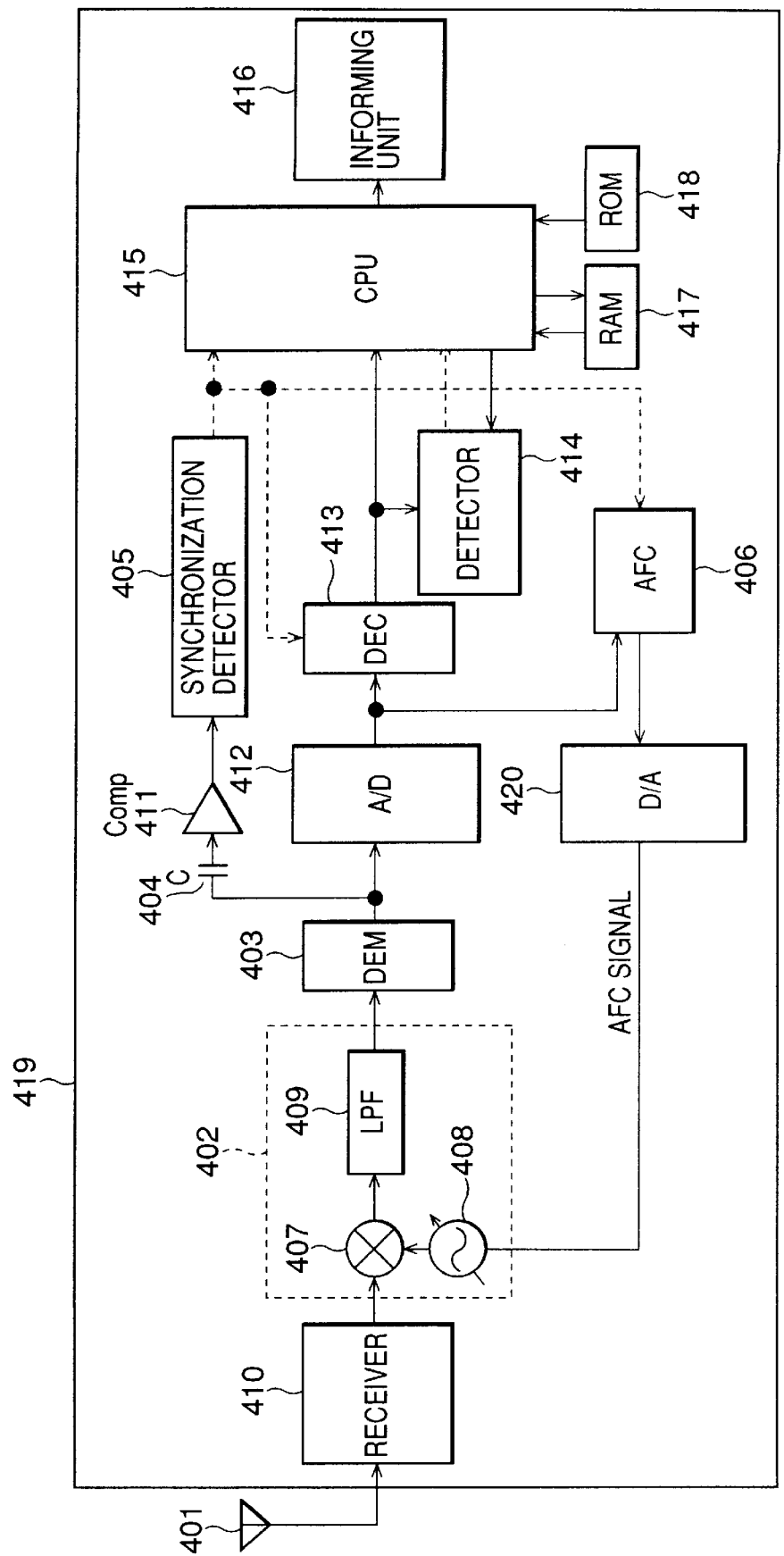
FIG. 4 is a function block diagram of showing a communication apparatus having a frequency offset correcting function in accordance with a further embodiment of the present invention.

A communication apparatus having a frequency offset correcting function of a third embodiment in accordance with the present invention is explained with reference to FIG. 4. In FIG. 4, a solid line represents a signal line, and a dashed line represents a control line. A communication apparatus having a frequency offset correcting function 419 shown in FIG. 4 is provided with an antenna 401, a carrier wave frequency converting unit 402, a demodulating unit 403, a condenser coupling unit 404, a synchronization detecting unit 405, an AFC unit 406, a receiving unit 410, a comparator unit (Comp) 411, an A/D converter unit 402, a decoding unit 413, a detecting unit 414, a control unit (CPU) 415, an informing unit 416, an RAM 417 and an ROM 418.

The antenna 401 receives the FSK (FM) modulation signal and output the received signal. The receiving unit 410 carries out an amplification and a band limit for the received signal and the like. The carrier wave frequency converting unit 402 is provided with a mixer unit 407, a local oscillator 408 and an LPF unit 409. The local oscillator 408 oscillates a local oscillation signal having a changeable oscillation frequency. The mixer unit 407 mixes the local oscillation signal outputted by the local oscillator 408 and an input signal (an output signal of the receiving unit 410) to thereby mix down a frequency of the input signal. The LPF unit 409 removes an unnecessary element from the output signal of the mixer unit 407 and outputs the frequency-converted signal.

The demodulating unit 403 FM-demodulates the frequency-converted signal and outputs the demodulation signal. The condenser coupling unit 404 cuts the direct current element of the demodulation signal. There may be a case that the comparator unit 411 is composed of an A/D converter in order to input an output signal of the condenser coupling unit 404 to the synchronization detecting unit 405 having a logic configuration. The synchronization detecting unit 405 compares an input signal (an output signal of the comparator unit 411) with a known synchronization signal to thereby carry out the synchronization detection, and then outputs a synchronization detection signal at a time of detecting the synchronization state.

The A/D converter unit 412 sends the demodulation signal to the decoding unit 413 and the AFC unit 406 having logic configurations. The decoding unit 413 converts a multiple-value signal of the demodulation signal into a two-value (bit), and further decodes an error revision sign (BCH and the like). The detection unit 414 compares a self-address, which is stored in advance and read out from the ROM 418, with the input signal to thereby carry out the self-address detection. The CPU 415 controls them. The RAM 417 is associated with the CPU 415. The informing unit 416 is provided with a speaker, an LED, an LCD and the like in order to inform the self-address reception.

The AFC unit 406 calculates the frequency offset. A D/A converter unit 420 converts a logic output signal of the AFC unit 406 having a logic configuration, into an analog signal (AFC signal) that can be inputted to the local oscillator 408.

Next, an operation of the communication apparatus having the frequency offset correcting function shown in FIG. 4 is explained.

The FSK (FM) modulation signal received by the antenna 401 is amplified and band-limited by the receiving unit 410. Then, it is FM-demodulated by the demodulating unit 403, after the carrier wave frequency thereof is changed by the carrier wave frequency converting unit 402.

Next, the synchronization detecting unit 405 carries out the synchronization detection from the demodulation signal outputted by the demodulating unit 403. However, this communication apparatus 419 is driven in such a way that the frequency offset correction is not applied before the synchronization state is detected, and that the frequency offset correction is applied after the synchronization state is detected. For this reason, there may be the possibility that the synchronization detecting unit 405 can not carry out the synchronization detection because of the extremely large deviation of the frequency offset, when the synchronization detecting unit 405 carries out the synchronization detection. In order to protect against this possibility, after the direct current element of the demodulation signal is removed by the C-coupling, the signal is sent through the comparator unit 411 to the synchronization detecting unit 405.

A level of the demodulation signal outputted by the demodulating unit 403 is A/D converted by the A/D converter unit 412 which is connected directly to the demodulating unit 403, and then sent to the AFC unit 406. The AFC unit 406 calculates the frequency offset of the frequency-converted signal from the signal level of the inputted FM demodulation, and outputs as the AFC signal a signal indicating a calculated result. Generally, in a case of the FM demodulation, the deviation of the carrier wave frequency of the FSK (FM) modulation wave can be easily calculated since it is proportional to the deviation of the direct current level in the demodulation signal. This AFC signal is inputted to the local oscillator 408 to thereby change the input carrier wave frequency. At this time, the AFC unit 406 carries out the frequency offset correction, with the synchronization detection signal from the synchronization detecting unit 405 as a trigger.

A signal to which the frequency offset correction is not applied is inputted to the decoding unit 413, before the synchronization state is detected. However, a correct signal to which the frequency offset correction is applied is inputted after the synchronization state is detected. Also, the decoding unit 413 receives the synchronization detection signal to thereby obtain a decoding timing.

When receiving the synchronization area 301 (FIG. 3) of the TDMA signal, the synchronization detecting unit 405 outputs the synchronization detection signal. As mentioned above, the AFC unit 406 receives the synchronization detection signal to thereby carry out the frequency offset correcting operation.

When the CPU 415 receives the synchronization detection signal from the synchronization detecting unit 405, it starts to input the decoding signal from the decoding unit 413 and receives the system information area 302 (FIG. 3). Next, when beginning to receive the address area 303 (FIG. 3), the detecting unit 414 carries out a detecting action of the self-address stored in advance in the ROM 418. When the CPU 415 receives a self-address detection signal from the detecting unit 414, it further receives message data of the message area 304 (FIG. 3) from the decoding unit 413, and stores in the RAM 417. An informing action, such as speaking of the speaker, light emission of the LED, display of the LCD or the like, is carried out by the informing unit 416.

Figure 5:
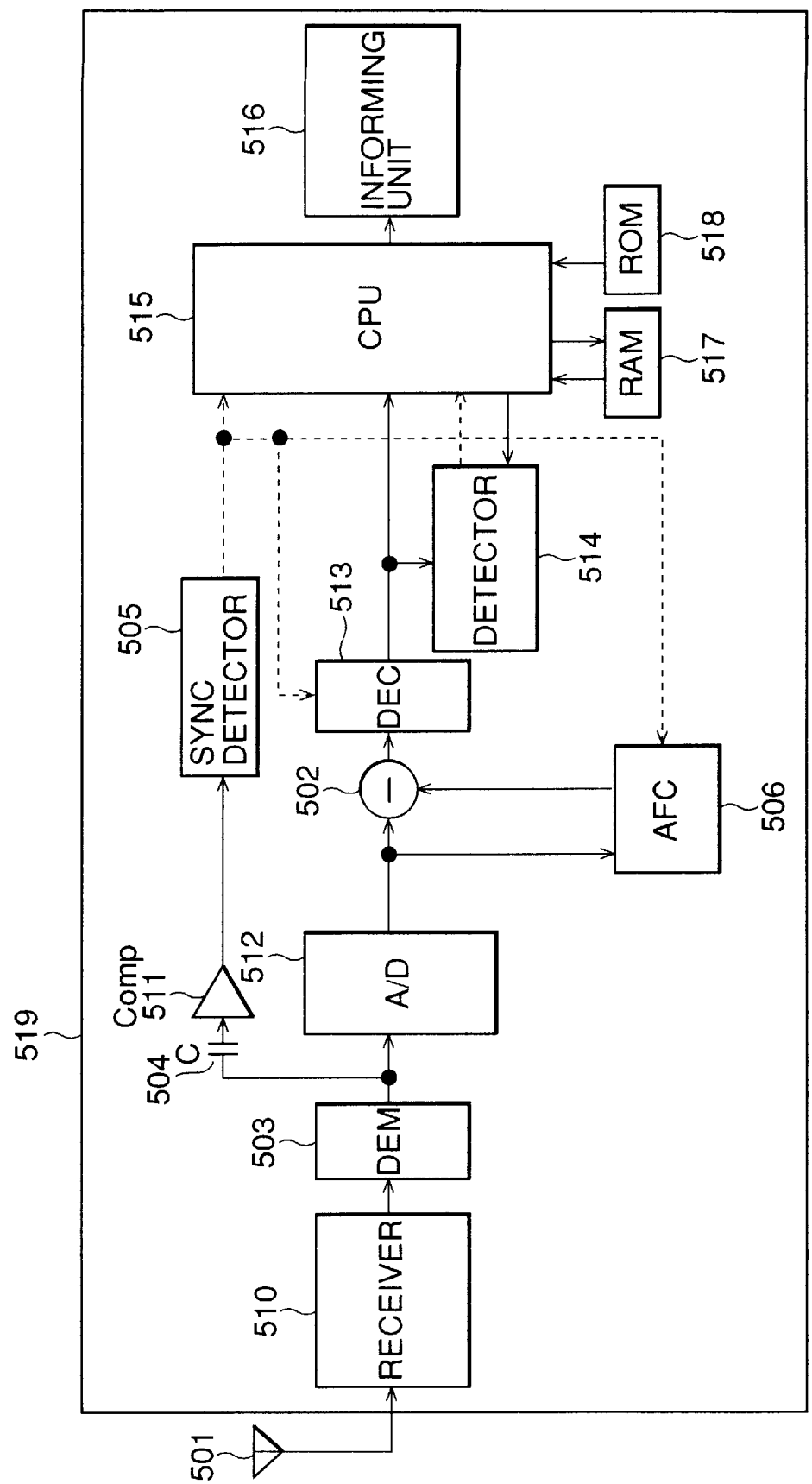
FIG. 5 is a function block diagram of showing a communication apparatus having a frequency offset correcting function in accordance with a still further embodiment of the present invention.

A communication apparatus having a frequency offset correcting function of a fourth embodiment in accordance with the present invention is explained with reference to FIG. 5. In FIG. 5, a solid line represents a signal line, and a dashed line represents a control line. A communication apparatus having a frequency offset correcting function 519 shown in FIG. 5 is such a communication apparatus that can receive a multiple-value FSK (FM) signal, and is provided with an antenna 501, an offset feedback unit 502, a demodulating unit 503, a condenser coupling unit 504, a synchronization detecting unit 505, an AFC unit 506, a receiving unit 510, a comparator unit (Comp) 511, a decoding unit 513, a detecting unit 514, a control unit (CPU) 515, an informing unit 516, an RAM 517 and an ROM 518.

The antenna 501 receives the FSK (FM) modulation signal and output the received signal. The receiving unit 510 carries out the amplification and the band limit for the received signal and the like.

The demodulating unit 503 FM-demodulates an output signal of the receiving unit 510 and outputs the demodulation signal. The condenser coupling unit 504 cuts the direct current element of the demodulation signal. There may be a case that the comparator unit 511 is composed of the A/D converter in order to input an output signal of the condenser coupling unit 504 to the synchronization detecting unit 505 having a logic configuration. The synchronization detecting unit 505 compares an input signal (an output signal of the comparator unit 511) with a known synchronization signal to thereby carry out the synchronization detection, and then outputs a synchronization detection signal at a time of detecting the synchronization state.

The A/D converter unit 512 sends the demodulation signal to the offset feedback unit 502 and the AFC unit 506 having logic configurations. The offset feedback unit 502 feeds back the AFC signal indicating the frequency offset to the demodulation signal to thereby change a level of a signal sent to the decoding unit 513. The decoding unit 513 converts a multiple-value signal of the demodulation signal (an output signal of the offset feedback unit 502) into a two-value (bit), and further decodes an error revision sign (BCH and the like). The detection unit 514 compares a self-address, which is stored in advance and read out from the ROM 518, with the input signal to thereby carry out the self-address detection. The CPU 515 controls them. The ROM 517 is associated with the CPU 515. The informing unit 516 is provided with a speaker, an LED, an LCD and the like in order to inform a self-address reception.

The AFC unit 506 calculates the frequency offset.

Next, an operation of the communication apparatus having the frequency offset correcting function shown in FIG. 5 is explained.

The FSK (FM) modulation signal received by the antenna 501 is amplified and band-limited by the receiving unit 510. Then, it is FM-demodulated by the demodulating unit 503.

Next, the demodulation signal outputted by the demodulating unit 503 is A/D converted by the A/D converter unit 512. Then, it is level-changed by the offset feedback unit 502, and sent to the decoding unit 513.

The synchronization detecting unit 505 carries out the synchronization detection from the demodulation signal outputted by the demodulating unit 503. However, this communication apparatus 519 is driven in such a way that the frequency offset correction is not applied before the synchronization state is detected, and that the frequency offset correction is applied after the synchronization state is detected. For this reason, there may be the possibility that the synchronization detecting unit 505 can not carry out the synchronization detection because of the extremely large deviation of the frequency offset, when the synchronization detecting unit 505 carries out the synchronization detection. In order to protect against this possibility, after the direct current element of the demodulation signal is removed by the C-coupling, the signal is sent through the comparator unit 511 to the synchronization detecting unit 505.

A level of the demodulation signal outputted by the demodulating unit 503 is A/D converted by the A/D converter unit 512 which is connected directly to the demodulating unit 503, and then sent to the AFC unit 506. The AFC unit 506 calculates the frequency offset of the demodulation signal from the level of the inputted demodulation signal, and outputs as the AFC signal a signal indicating this calculated result. Generally, in a case of the FM demodulation, the deviation of the carrier wave frequency of the FSK (FM) modulation wave can be easily corrected since it is proportional to the deviation of the direct current level in the demodulation signal. At this time, the AFC unit 506 carries out the frequency offset correcting operation, with the synchronization detection signal from the synchronization detecting unit 505 as a trigger.

A signal to which the frequency offset correction is not applied is inputted to the decoding unit 513, before the synchronization state is detected. However, a correct signal to which the frequency offset correction is applied is inputted after the synchronization stage is detected. Also, the decoding unit 513 receives the synchronization detection signal to thereby obtain the decoding timing.

When receiving the synchronization area 301 (FIG. 3) of the TDMA signal, the synchronization detecting unit 505 outputs the synchronization detection signal. As mentioned above, the AFC unit 506 receives the synchronization detection signal to thereby carry out the frequency offset correcting operation.

When the CPU 515 receives the synchronization detection signal from the synchronization detecting unit 505, it starts to input the decoding signal from the decoding unit 513 and receives the system information area 302 (FIG. 3). Next, when beginning to receive the address area 303 (FIG. 3), the detecting unit 514 carries out the detecting action of the self-address stored in advance in the ROM 518. When the CPU 515 receives the self-address detection signal from the detecting unit 514, it further receives the message data of the message area 304 (FIG. 3) from the decoding unit 513, and stores in the RAM 517. The informing action, such as the speaking of the speaker, the light emission of the LED, the display of the LCD or the like, is carried out by the informing unit 516.

Figure 6:
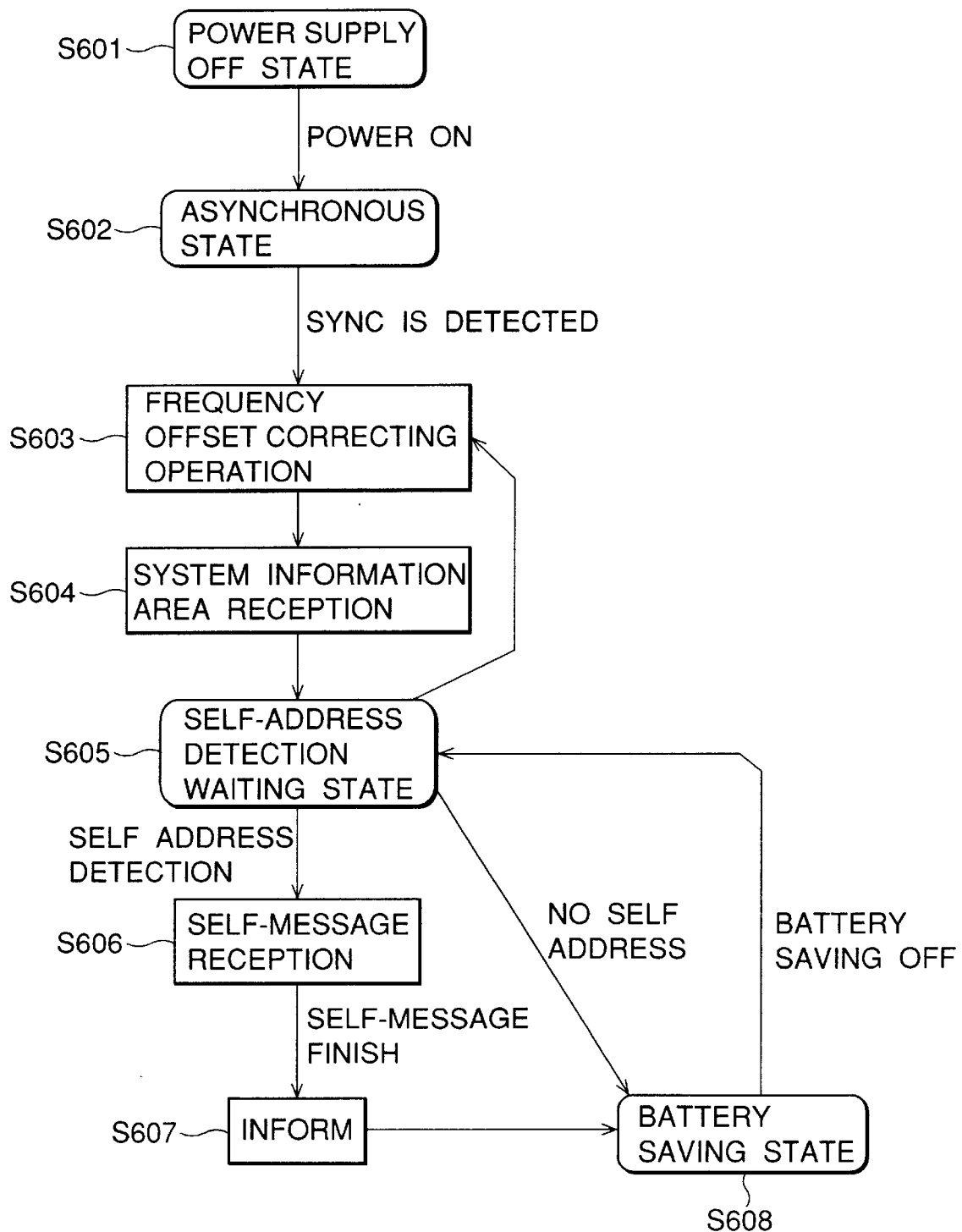
FIG. 6 is a flow chart of explaining operations of a communication apparatus in accordance with the present invention.

FIG. 6 is a flow chart of explaining the operations of the communication apparatus in accordance with the present invention. Next, the operations of the communication apparatus are explained with reference to FIGS. 4 and 5.

In the communication apparatuses 419, 519, when the power supply is turned on from a power supply off state (Step 601), the communication apparatus becomes in an asynchronous state (Step 602) in which the synchronization state is not detected.

From the above-mentioned state, when the synchronization detecting actions are carried out by the synchronization detecting units 405, 505 of the C-couplings 404, 504, the AFC units 406, 506 carry out the frequency offset correcting action (Step 603).

After that, the control units (CPUs) 415, 515 carry out the system information area reception (Step 604) in order to receive the system information area 302, and then become in a self-address detection waiting state (Step 605) in order to receive the address area 303. When the detecting units 414, 514 carry out the self-address detection, the self-message reception is carried out at the next message area 304 (Step 606). When the self-message is finished, the informing action is carried out by the informing units 416, 516 (Step 607).

After the informing action is finished, the communication apparatuses 419, 519 enter in a battery saving state in order to making a consuming electric power small (Step 608).

In a case that the self-address is not detected, the communication apparatuses 419, 519 immediately become in the battery saving state (Step 608).

At a next reception timing (given by the information stored in the ROMs 418, 518 and the system information area), the control unit turns the battery saving off, and becomes again in the self-address detection waiting state (Step 605). When a next synchronization detection is carried out, it again carries out the frequency offset correcting operation (Step 603).

Incidentally, the present invention is not limited to the above-mentioned embodiments. Then, various changes and modifications may be constructed without departing from the spirit and scope of the present invention. For example, the present invention can be applied to not only the FSK (FM) modulation signal, but also a PSK (PM) modulation signal.

Thanks to the above-mentioned configurations, the present invention has the advantageous effects described below.

By utilizing the fact that the synchronization pattern is generally the pattern in which the level is not generated, the direct current component of demodulation signal is by the C-coupling, and is inputted to the synchronization detecting unit. With the synchronization-detected signal by the synchronization detecting unit as the trigger, the frequency offset correcting operation is carried out by the AFC unit to which the demodulation signal is directly connected. Accordingly, the correction range of the frequency offset correction can be set extremely larger than general values (the maximum frequency deviation at the two-value, and ⅓ times the maximum frequency deviation at the four-value). Further, the method in accordance with the present invention is easy. In this method, in a case of C-coupling the digital signals, since the normal digital signal contains the direct current element, the error is brought about in the data because of the cut of the direct current element by the C-coupling. However, generally the synchronization signal is the pattern in which the level is not deviated. Thus, even if the direct current element is cut by the C-coupling, this method utilizes the performance that the data error is not brought about by the above-mentioned situation.

The invention may be embodied in other specific forms without departing from the spirit or essential characteristics thereof. The present invention embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of controlling a frequency offset correcting function of a communication apparatus, comprising:

inputting as a received signal a time division multiple access (TDMA) signal angle-modulated by a signal containing a synchronization signal, a level of which is not deviated;

including a local oscillator for oscillating a local oscillation signal having a changeable oscillation frequency, and converting a carrier wave frequency of said received signal on the basis of said local oscillation signal and outputting a frequency-converted signal;

demodulating said frequency-converted signal and outputting a demodulation signal;

removing a direct current element from said demodulation signal and outputting a demodulation signal without a direct current element;

comparing said synchronization signal contained in said demodulation signal without said direct current element with a known signal pattern to thereby carry out a synchronization detection, and outputting a synchronization detection signal when detecting a synchronization state; and with said synchronization detection signal as a trigger, calculating a frequency offset of said demodulation signal, and supplying said calculated frequency offset as an AFC signal to said local oscillator, thereby changing an input carrier wave frequency.

2. A method of controlling a frequency offset correcting function of a communication apparatus, comprising:

inputting as a received signal a time division multiple access (TDMA) signal angle-modulated by a signal containing a synchronization signal, a level of which is not deviated;

demodulating said received signal and then outputting a demodulation signal;

removing a direct current element from said demodulation signal and outputting a demodulation signal without a direct current element;

comparing said synchronization signal contained in said demodulation signal without said direct current element with a known signal pattern to thereby carry out a synchronization detection, and outputting a synchronization detection signal when detecting a synchronization state;

with said synchronization detection signal as a trigger, calculating a frequency offset of said demodulation signal, and outputting said calculated frequency offset as an AFC signal; and outputting an output signal, whereby said AFC signal level shifts said demodulation signal after said synchronization state is detected, thereby creating said output signal.

3. A communication apparatus having a frequency offset correcting function and which receives a time division multiple access (TDMA) signal modulated by a signal containing a synchronization signal a level of which is not deviated, said apparatus comprising:

a demodulator for carrying out a demodulating action and outputting a demodulation signal containing said synchronization signal;

a synchronization detector for comparing said synchronization signal contained in said demodulation signal with a known signal pattern to carry out a synchronization detection and for outputting a synchronization detection signal upon detection of a synchronization state; and an automatic frequency controller for, upon receipt of said synchronization detection signal as a trigger, calculating a frequency offset from said demodulation signal and outputting said calculated frequency offset as an automatic frequency controller (AFC) signal, wherein said demodulator and said synchronization detector are coupled to each other by circuitry for removing a direct current element from said demodulation signal.

4. A communication apparatus according to claim 3, wherein said circuitry for removing said direct current element from said demodulation signal comprises a condenser coupler.

5. A communication apparatus according to claim 3, further comprising a carrier wave frequency converter for converting a carrier wave frequency of said TDMA signal and for sending said frequency-converted signal to said demodulator.

6. A communication apparatus having a frequency offset correcting function according to claim 3, further comprising an offset control circuit for level shifting said demodulation signal with said AFC signal to change an output signal.

7. A communication apparatus according to claim 3, wherein said TDMA signal is angle-modulated.

8. A communication apparatus having a frequency offset correcting function, comprising:

an input circuit for inputting as a received signal a time division multiple access (TDMA) signal modulated by a signal containing a synchronization signal a level of which is not deviated;

a demodulator for demodulating said received signal and outputting a demodulation signal;

a circuit for removing a direct current element from said first demodulation signal and outputting a demodulation signal without a direct current element;

a synchronization detector for comparing said demodulation signal without said direct current element with a known signal pattern to carry out a synchronization detection and for outputting a synchronization detection signal upon detecting a synchronization state;

an automatic frequency controller for, upon receipt of said synchronization detection signal, calculating a frequency offset of said demodulation signal, and outputting said calculated frequency offset as said AFC signal; and an offset control circuit for outputting an output signal, whereby offset control circuit creates said output signal by level shifting said demodulation signal with said AFC signal after synchronization detection.

9. A method of controlling a frequency offset correcting function of a communication apparatus, comprising:

inputting as a received signal a time division multiple access (TDMA) signal angle-modulated by a signal containing a synchronization signal, a level of which is not deviated;

producing a local oscillation signal having a variable oscillation frequency, and converting a carrier wave frequency of said received signal on the basis of said local oscillation signal, and outputting a frequency-converted signal;

demodulating said frequency-converted signal to produce a demodulation signal;

removing a direct current element from said demodulating signal, thereby creating a demodulation signal without a direct current element;

comparing said synchronization signal contained in said demodulation signal without said direct current element with a known signal pattern, carrying out a synchronization detection, and outputting a synchronization detection signal upon detection of a synchronization state; and calculating a frequency offset of said demodulated signal, and outputting said calculated frequency offset as an automatic frequency control (AFC) signal to control said local oscillation frequency used to convert said carrier wave frequency after the synchronization state is detected.

10. A method of controlling a frequency offset correcting function of a communication apparatus, comprising:

inputting as a received signal a time division multiple access (TDMA) signal angle-modulated by a signal containing a synchronization signal, a level of which is not deviated;

demodulating said received signal to produce a demodulation signal;

removing a direct current element from said demodulation signal, thereby creating a demodulation signal without a direct current element;

comparing said demodulation signal without said direct current element with a known signal pattern, carrying out a synchronization detection and then outputting a synchronization detection signal upon detecting a synchronization state;

calculating a frequency offset of said demodulation signal, and outputting said calculated frequency offset as an AFC signal after said synchronization state is detected; and using said AFC signal to shift said demodulation signal, thereby creating an output signal.

* * * * *